Figure 9:
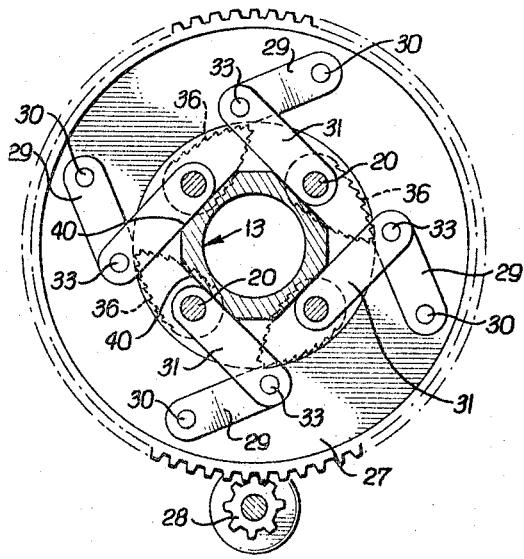

Sept. 6, 1966            H. N. BEHNKE           3,270,592
UNIVERSAL SUPPORTING AND DRIVING APPARATUS
FOR PIPE SUBJECTED TO THREADING
Filed Jan. 3, 1964                          3 Sheets-Sheet 1
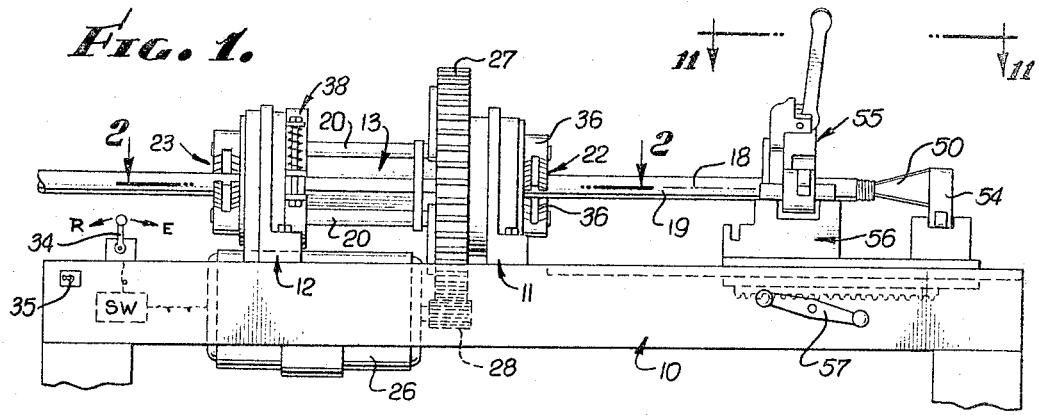
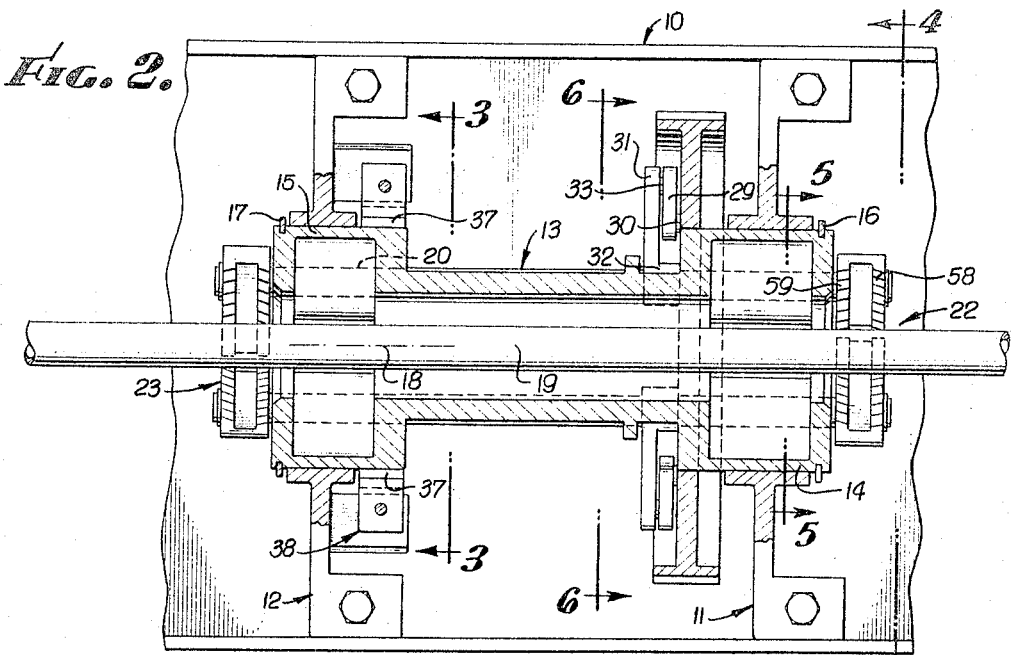
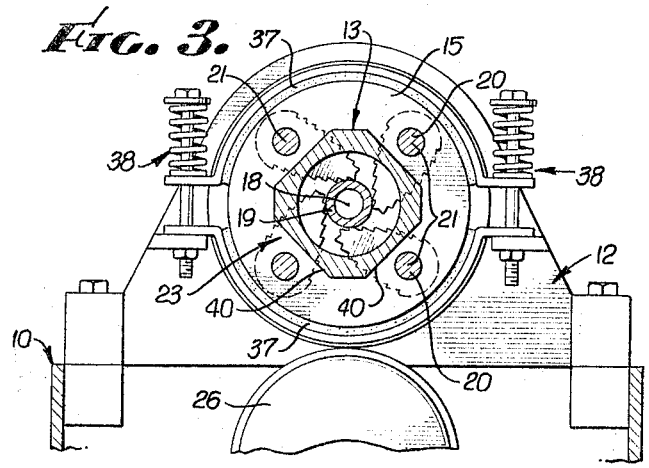
INVENTOR.
HOWARD N. BEHNKE
BY
White & Haefliger
ATTORNEYS.

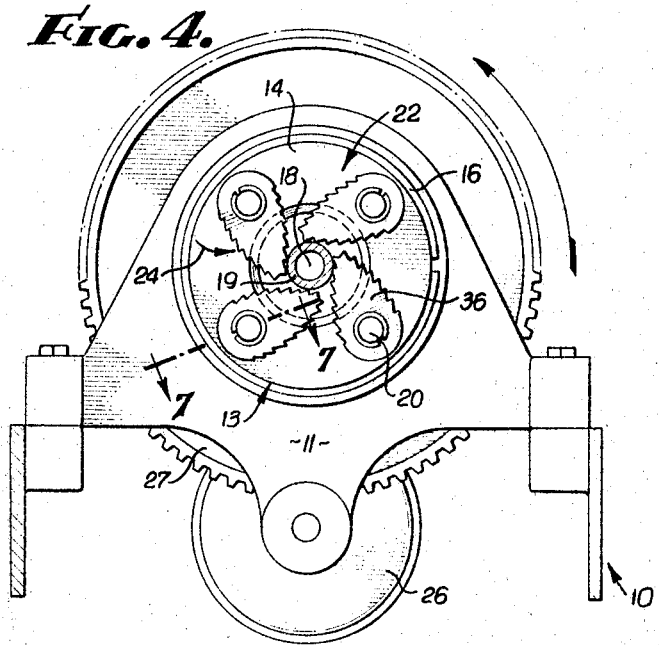
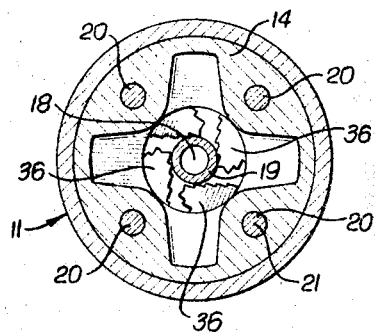
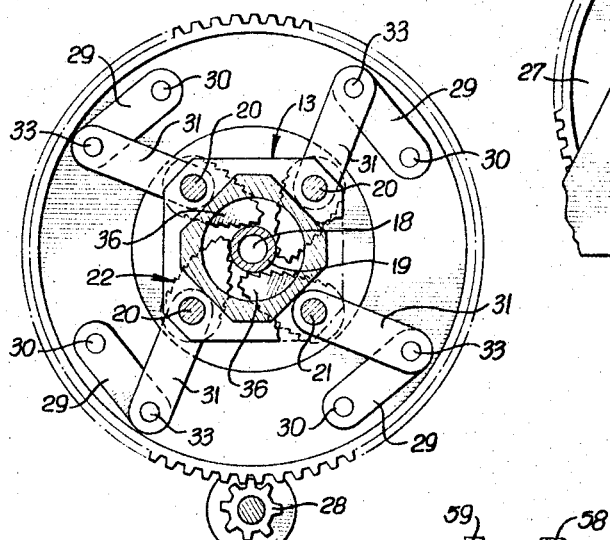
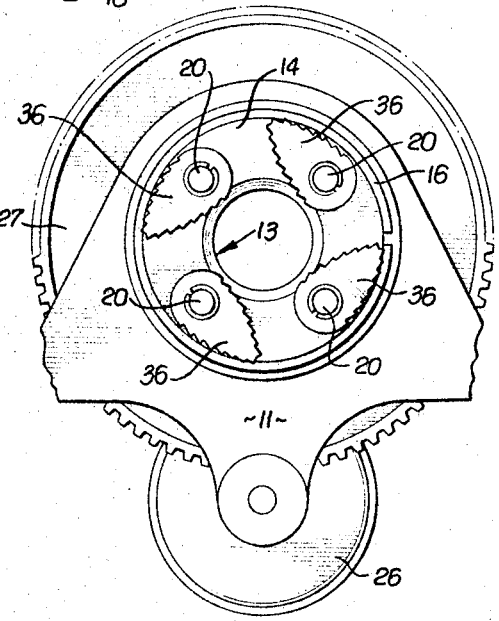
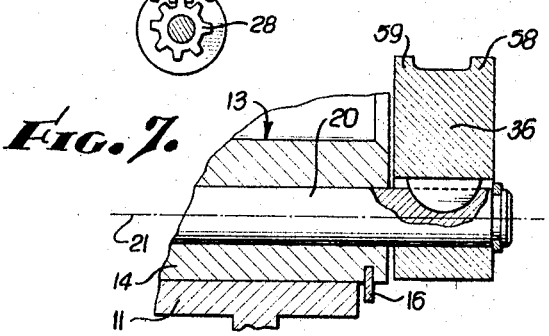

Sept. 6, 1966
H. N. BEHNKE
3,270,592
UNIVERSAL SUPPORTING AND DRIVING APPARATUS
FOR PIPE SUBJECTED TO THREADING
Filed Jan. 3, 1964
3 Sheets-Sheet 3

INVENTOR.
HOWARD N. BEHNKE
BY
White & Haefliger
ATTORNEYS.

United States Patent Office 3,270,592
Patented Sept. 6, 1966

3,270,592
UNIVERSAL SUPPORTING AND DRIVING APPARATUS FOR PIPE SUBJECTED TO THREADING
Howard N. Behnke, South San Gabriel, Calif., assignor to Collins Machinery Corporation, Monterey Park, Calif., a corporation of California
Filed Jan. 3, 1964, Ser. No. 335,587
5 Claims. (Cl. 77—73)

This invention relates generally to machines for centering and rotating workpieces such as pipe to be threaded, cut or otherwise subjected to a forming operation. More particularly the invention concerns improvements having to do with work gripping, centering, rotating and reaming, as will appear.

It is a major object of the invention to overcome certain disadvantages associated with the operation and performance of prior machines for rotating workpieces, such as pipe, upon which threads are to be formed. Such disadvantages include inability to accommodate a wide range of pipe sizes and particularly extremely small diameter pipe, lack of provision for rapid centering and gripping of pipe in both clockwise and counterclockwise driven modes for right and left hand threading, slippage of the pipe due to improper jaw gripping, as for example may result when the jaws are mutually offset along the pipe axis so that the pipe is able to undergo beam bending, inability to perform reaming operations without changing the position of the reamer depending upon whether the pipe is rotated clockwise or counterclockwise, and general lack of overall satisfactory performance due to the absence of those advantageous and unusual features of construction which characterize the present invention.

As will appear, the above problems have been found to be overcome by providing apparatus incorporating a set of like jaws of particular arrangement and construction having pivot axes spaced about a central axis defined by the centered pipe axis, so that the jaws may pivot inwardly toward the pipe in forward and reverse pivoting directions, together with means for carrying and selectively driving the jaws alternately in first and second modes of particular type. The first mode is characterized by inwardly forward pivoting of the jaws into gripping and centering engagement with the pipe or work and clockwise rotation of the jaws about the central axis for rotating the gripped pipe clockwise thereabout, whereas the second mode is characterized by inwardly reverse pivoting of the jaws into gripping and centering engagement with the pipe and counterclockwise rotation of the jaws about the central axis for rotating the gripped pipe counterclockwise.

The particular arrangement and construction of the jaws contributing to overcoming of prior difficulties as outlined above includes providing them with pipe gripping opposite faces tapering toward and terminating at jaw ends the spacing of which from the respective jaw pivot axes closely approaches the spacing of the respective jaw pivot axes from the central axis. As a result, pipe of extremely small outer diameter may be firmly gripped and rotated clockwise or counterclockwise about the central axis for right or left hand threading. Also, adjacent jaws are constructed and arranged to remain in mutually non-meshing relation during their pivoting so that corresponding points on adjacent jaws lie in a common plane normal to the central axis. These features result in positive clamping of the workpiece during both clockwise and counterclockwise rotation, without detrimental slippage producing bending or loosening of the work between the jaws, and the work remains centered for threading or other forming operations.

Other features of the invention include the provision of jaw pivots supported by a rotary carrier and constructed to couple a reversible drive to the carrier in such manner as to effect selective pivoting and rotation of the jaws in the above mentioned modes the connection of the drive to the pivots being remote from the jaws. Also, a particular jaw configuration found to be of unusual advantage incorporates a narrow oval shaped outline defined by the work gripping opposite faces of the jaw, these being symmetrical with respect to a plane passing through the jaw pivot axis and the jaw terminal end. Further, the jaw opposite faces are serrated, the serrations on each face formed in two parallel rows extending toward the jaw terminal end, the jaw body being solid between the rows and the rows on adjacent jaws being in the same plane. Finally, the invention contemplates the provision of an unusual pipe reamer characterized by a reamer body tapering toward but spaced from the jaws along the central axis, the body having a pair of pipe reaming edges presented for alternate reaming engagement with the pipe interior surface during clockwise or counterclockwise rotation thereof.

Figure 10:
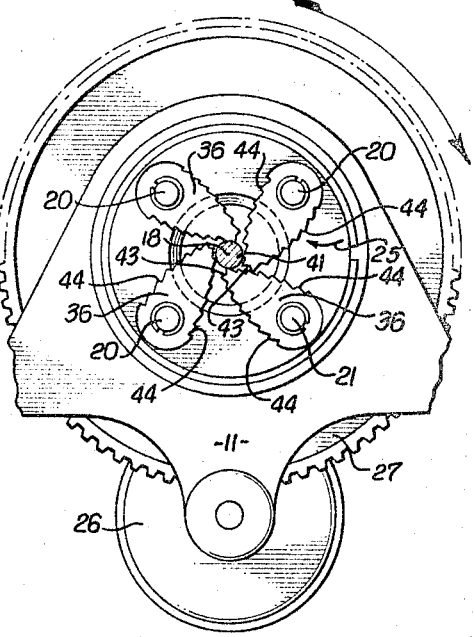
Figure 11:
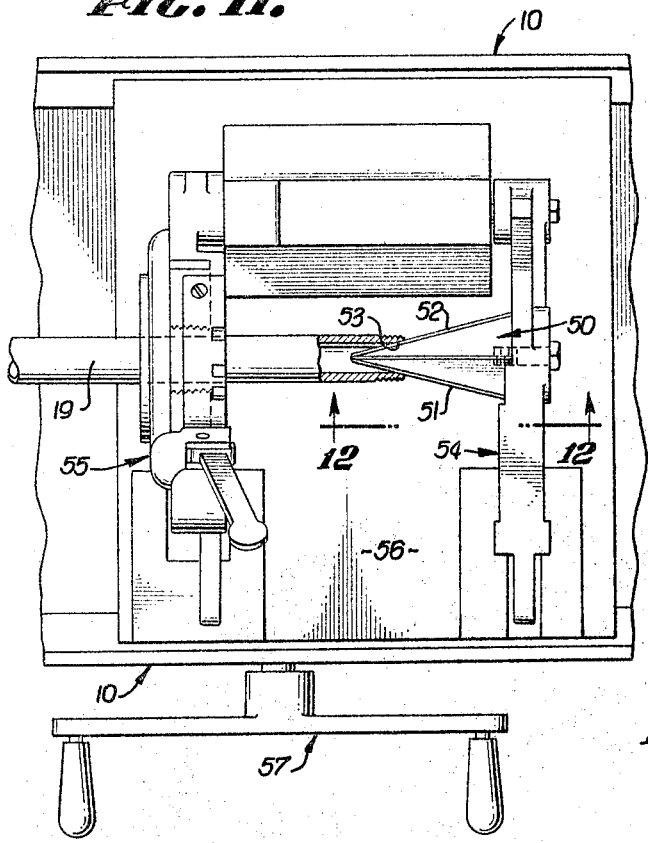
Figure 12:
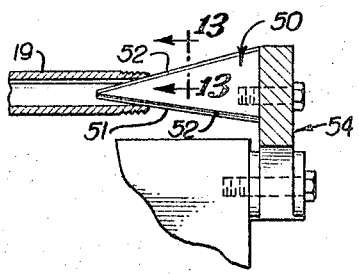
Figure 13:
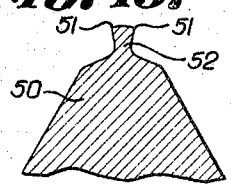

These and other objects and advantages of the invention, as well as the details of an illustrative embodiment, will be more fully understood from the following detailed description of the drawings, in which FIG. 1 is a front elevation of the overall apparatus;
FIG. 2 is an enlarged horizontal section taken on line 2—2 of FIG. 1;
FIG. 3 is a fragmentary sectional elevation taken on line 3—3 of FIG. 2;
FIG. 4 is a sectional elevation taken on line 4—4 of FIG. 2, showing the jaws engaging pipe for a right hand threading operation;
FIG. 5 is a sectional elevation taken on line 5—5 of FIG. 2;
FIG. 6 is a sectional elevation taken on line 6—6 of FIG. 2;
FIG. 7 is an enlarged section taken through a jaw on line 7—7 of FIG. 4;
FIG. 8 is a view like FIG. 4 but showing the jaws opened up in position to be pivoted back inwardly and forwardly into gripping and centering engagement with work as in FIG. 4;
FIG. 9 is a view like FIG. 6, but showing the jaws opened up as in FIG. 8;
FIG. 10 is a view like FIGS. 4 and 8, but showing the jaws pivoted inwardly and reversely into gripping and centering engagement with the work to be rotated for a left hand threading operation;
FIG. 11 is an enlarged top plan view taken on line 11—11 of FIG. 1;
FIG. 12 is a fragmentary elevation taken on line 12—12 of FIG. 11; and
FIG. 13 is an enlarged section taken on line 13—13 of FIG. 12.

Referring first to FIGS. 1–3, the overall apparatus includes a leg supported base 10 mounting front and rear pillow blocks 11 and 12. The latter have hubs which in turn journal a hollow spindle assembly or carrier 13 at front and rear spindle flanges 14 and 15, retainers 16 and 17 on the hubs acting to retain the spindle assembly against axial dislodgement relative to the pillow blocks. Accordingly, the spindle is rotatable about a longitudinal and central axis of rotation indicated at 18, which coincides with and may be considered as defined by the axis of a workpiece such as pipe 19 extending within the spindle interior.

The carrier or spindle 13 supports parallel pivots such as rods 20 having pivot axes 21 equally spaced at 90 degree intervals about the central axis 18, and like jaws are attached to the extreme forward and rearward ends of the pivots as indicated by forward and rearward jaw sets 22 and 23. As will be seen, the jaws may pivot inwardly toward the work such as pipe 19 in forward and reverse pivoting directions, the forward and inward direction indicated by the arrow 24 in FIG. 4. Likewise, the reverse and inward direction is shown by the arrow 25 in FIG. 10. Pivot rods 20 are suitably journaled for pivoting by the spindle hubs 14 and 15.

The pivots 20 are selectively actuated to pivot about axes 21 by a reversible drive typically including a reversible motor 26 carried by the base 10, a ring gear 27 driven by the motor pinion 28, links 29 having pivot connection at 30 to the gear 27, and levers 31 attached at 32 to the pivots 20 and having pivot connection at 33 to the links. As seen in FIG. 2, the ring gear is suitably journaled for rotation on and relative to the spindle flange 14. FIG. 1 shows a switch lever 34 in the "off" position and movable to the right or left for selective forward or reverse actuation of the drive motor. A manual speed control for the motor may also be provided as is indicated at 35.

Turning now to FIG. 6, the jaws 36 of the forward set 22 are illustrated as having been driven in what may be considered as a first mode characterized by inwardly forward pivoting into gripping and centering engagement with the workpiece or pipe 19. Such pivoting is effected in response to clockwise rotation of the gear wheel 27, with the pivot carrying spindle assembly 13 frictionally held against rotation about the central axis 18. In this regard, FIGS. 1–3 illustrate friction band segments 37 held clamped against the rearward flange 15 to resist spindle rotation, a clamp and tension spring assembly 38 being provided for this purpose. After the jaws grip and center the workpiece, they are blocked by the work against further inward pivoting, whereby the drive then rotates the spindle 13, jaws 36 and work in a clockwise direction about the central axis 18 as seen in FIG. 6. The work may then be typically subjected to a right hand threading operation as will be described. At this time the hub 15 rotates in sliding frictional engagement with the friction band segments, and one advantageous result of the jaw configuration in the assembly consists in the lessening of needed friction imposed by the band segments, with consequent lessening of wear and heat generation during rotary driving of the work.

FIGS. 8 and 9 show the jaws completely released from the work and pivoted to near extreme outward position, for subsequent inward and forward pivoting to the condition seen in FIG. 6. Such outward pivoting is limited by engagement of the levers 31 with peripheral flats 40 on the body of the spindle or carrier 13.

Recognizing that FIG. 4 shows the same jaw condition as seen in FIG. 6, reference will now be made to FIG. 10 which is like FIG. 4 but illustrates the reversely pivoted condition of the jaws. In that view the forward set of jaws 36 is seen as having been driven in what may be considered as a second mode characterized by inwardly reverse pivoting of the jaws into gripping and centering engagement with the work. Such pivoting is effected in response to counterclockwise pivoting of the gear wheel 27 (clockwise in FIG. 10), with the spindle assembly initially held frictionally against rotation about the central axis 18. After the jaws grip the workpiece seen in the form of a rod 41, the drive then rotates the spindle 13, jaws 36 and work in a counterclockwise direction about the central axis, against the frictional resistance imposed by the band segments 37.

Considering the above described first and second modes in which the jaws may be driven, it will be seen that shifting from the first to the second modes is carried out by selective rotation of the gear wheel 27 in a clockwise direction, when looking at FIG. 6, in order to carry the inner tips or ends 43 of the jaws "over-center" with respect to the center lines between the central axis 18 and the pivot axes 21. Likewise, shifting from the second to the first modes involves the reverse of the above.

Referring now to the specific construction and arrangement of the jaws of each set, they are seen in FIG. 10 to have work gripping opposite faces 44 tapering toward and terminating at the jaw ends 43 the spacing of which from the respective jaw pivot axes 21 closely approaches the spacing of the respective jaw pivot axes from the central axis 18, whereby work of extremely small cross section may be firmly gripped and rotated clockwise or counterclockwise about axis 18. It is important that adjacent jaws remain in mutually non-meshing relation during their pivoting and that corresponding points of adjacent jaws lie in a common plane normal to the central axis 18. Accordingly, the jaws are all equally axially spaced from the plane of the gear wheel, for example, and hence are subjected to the same stress and strain when gripping and rotating the work during threading. Since jaw deflection under load is symmetrical, there is no differential tendency of the jaws to slip relative to the work due to different stress and strain relationships imposed on the jaws. Consequently, the system is balanced and at the same time work of very small diameter may be gripped and rotated. Also, the work may be rotated in either direction, as described above, so that a combination of desirable features is provided overcoming the problem of incompatibility of such features in a single device.

In addition, the pivots are actuated by levers 31 close to the mid-point between the like jaw sets 22 and 23, and relatively remote therefrom. Accordingly, torsional deflection of the pivot rods at opposite sides of the levers 31 is proximately equalized with near equal clamping or gripping action on the pipe as respects the two jaw sets.

Further refinements of the jaw design contributing to beneficial compatibility include the narrow oval shaped outline of the jaw opposite faces, the latter being symmetrical with respect to a plane passing through the jaw pivot axis and the jaw terminal end. Also the jaw opposite faces are serrated, the serrations on each face being formed in herringbone relation and in rows 58 and 59 extending toward the jaw terminal end 43, as seen in FIG. 2. That figure also illustrates the feature that corresponding rows of serrations on adjacent jaws remain in a common plane normal to the central axis 18 during jaw pivoting. Finally, as best seen in FIG. 7, the jaws are essentially solid or not hollowed out between the rows of serrations, contributing to jaw strength.

Referring now to FIGS. 1 and 11–13, a reamer body is shown at 50 longitudinally spaced along the central axis from the jaws 36 of set 22. Body 50 tapers toward those jaws and has pipe reaming edges 51 on flutes 52 presented for alternate reaming engagement with the pipe interior surface at 53 during clockwise or counterclockwise rotation thereof. In this regard, reaming is necessary to true and countersink the pipe terminal bore after threading, which displaces pipe metal. This double reaming edge construction makes it unnecessary to change from a clockwise to a counterclockwise reamer when the pipe threading operation is changed from right hand to left hand configuration. A reamer body support is seen at 54, and a pipe threading head is generally indicated at 55 in FIGS. 1 and 11. The latter head is mounted on a carriage 56 movable generally axially by the manual control 57.

I claim:

1. In apparatus of the character described, the combination comprising
   (a) a centrally hollow carrier having a horizontal central axis of rotation and a first bearing structure by which the carrier is supported for rotation;
   (b) a series of elongated pivot members defining pivot axes circularly spaced about said central axis and extending parallel thereto, the carrier supporting the members to pivot relative thereto and about said pivot axes;

(c) a first set of work gripping jaws having driven connection with the pivot members at one end of the carrier;

(d) a second bearing structure supporting the carrier for rotation and at a location axially spaced from said first bearing structure, and a second set of work gripping jaws having driven connection with said pivot members adjacent the opposite end of said carrier;

(e) levers extending in the space between said first and second bearing structures and operatively connected with the pivot members so as to simultaneously pivot the members and both sets of jaws, the jaws of both sets being located to simultaneously grip work projecting through the hollow carrier as the pivot members are rotated by said levers;

(f) a drive rotor rotatable clockwise and counterclockwise about said central axis;

(g) and links operatively connected with the rotor and levers to transmit rotary drive from the rotor to said levers so as first to pivot the pivot members relative to the carrier to carry the both sets of jaws into rotary driving engagement with work projecting axially from within the carrier hollow, and thereafter to rotate the carrier about said central axis.

2. The apparatus of claim 1 wherein said jaws have work gripping serrations, with adjacent jaws of a set remaining in mutually non-meshing relation during their pivoting so that corresponding serrations on adjacent jaws of a set remain in a common plane normal to said central axis and spaced from said links and levers during said pivoting.

3. The apparatus of claim 1 including stop means on the carrier to limit pivoting of the levers acting to pivot the sets of jaws outwardly from the central axis.

4. The apparatus of claim 1 and including a reamer body axially spaced from and tapering toward said first set of jaws, said reamer body having reaming edges presented for reaming engagement with the interior surface of work in the form of a pipe during clockwise or counterclockwise rotation thereof.

5. The apparatus of claim 2 in which each jaw of a set has opposite faces and a terminal remote from the jaw pivot axis to define a generally narrow oval shaped jaw outline, said serrations being formed on each jaw face and in two rows extending toward the jaw terminal, the jaws being connected only to said pivot members.

References Cited by the Examiner

UNITED STATES PATENTS

| | | | |
|---|---|---|---|
| 1,228,951 | 6/1917 | Morton | 77—73 |
| 2,980,434 | 4/1961 | Hoffman | 279—106 |
| 2,985,458 | 5/1961 | Everett | 279—106 |
| 3,020,787 | 2/1962 | Cusick | 77—73 |

FRANCIS S. HUSAR, *Primary Examiner.*

WILLIAM W. DYER, JR., *Examiner.*